United States Patent [19]

Chen

[11] Patent Number: 5,630,660
[45] Date of Patent: May 20, 1997

[54] WARNING LIGHT

[76] Inventor: Wei-Fu Chen, No. 16, Lane 533, Da-Chi Road, Da-Li City, Taichung, Taiwan

[21] Appl. No.: 648,540

[22] Filed: May 16, 1996

[51] Int. Cl.$^6$ ........................................................ F21L 7/00
[52] U.S. Cl. ..................... 362/183; 362/184; 362/190; 362/191
[58] Field of Search ................................. 362/183, 184, 362/190, 191

[56] References Cited

U.S. PATENT DOCUMENTS

| | | | |
|---|---|---|---|
| 4,841,416 | 6/1989 | Doss | 362/183 |
| 5,319,365 | 6/1994 | Hillinger | 362/191 |

*Primary Examiner*—Carroll B. Dority
*Attorney, Agent, or Firm*—Ostrolenk, Faber, Gerb & Soffen, LLP

[57] ABSTRACT

A warning light includes a base to which an elongated post, formed by a plurality of tubular segments telescopically jointed, is fixed to support on the top end of the post a lamp unit. A battery set is placed inside the base to power the lamp unit with electrical wire extending through the post. A plurality of legs are provided to each extend through holes formed on the base. Each of the legs is constituted by a primary member and a secondary member pivoted together with the primary member extending out of the respective hole of the base and the secondary member movably received within the hole. The hole is provided with an inclined inside surface which define an expanded lower opening on the underside of the base so as to allow the primary member to extend from the base in an inclined, diverging manner to define an enlarged bottom area for more stably supporting the warning light. A solar panel system is disposed on the lamp unit and housed by a transparent dome to serve as a secondary power source. The lamp unit is also provided with a plurality of sideways extending lugs to engage and hold the secondary members of the legs when the post is telescoped so as to provide a compact, stowed configuration.

16 Claims, 7 Drawing Sheets

5,630,660

WARNING LIGHT

FIELD OF THE INVENTION

The present invention relates generally to a warning light and in particular to a warning light with a collapsible frame structure.

BACKGROUND OF THE INVENTION

Movable warning lights have been widely used to provide warning indications, especially at construction sites. Conventionally, a warning light is provided with a heavy base to be placed on for example ground on which an elongated post is fixed to support on the top end of the post a lamp or other light source. An example of the conventional warning light is illustrated in FIG. 8 of the accompanying drawings wherein a base 3 in the form of a casing is provided. An elongated post 2 is fixed to the base 3 to support on the top end thereof a lamp or light source 1. A battery set, shown at phantom line in FIG. 8, is received and held within the base 3 to power the lamp 1 through electrical wire which is usually located outside the post 2. The battery set also serves as a weight to lower the center of gravity of the warning light.

Such a conventional warning light has several disadvantages. For example, the base 3 has a very limited bottom area which makes the overall structure very instable for the center of gravity of the warning light is very easy to fall out of the bottom area and thus leading in tip of the warning light. Further, the conventional warning light is not provided with a collapsible structure so that it occupies a large stowing space when not in use.

Thus, it is desirable to have a warning light which has a collapsible frame structure for space saving in storage and an enlarged bottom area for gravitational stability.

SUMMARY OF THE INVENTION

An object of the present invention is to provide a warning light which has a plurality of legs extending from the base of the warning light in a diverging manner so as to provide an enlarged bottom area for gravitational stability.

it is another object of the present invention to provide a warning light which has a collapsible frame structure for space saving in storage.

It is a further object of the present invention to provide a warning light which, in addition to the power source provided by a battery set, has solar panel means serving as a secondary power source.

To achieve the above objects, there is provided a warning light comprising a base to which an elongated post, formed by a plurality of tubular segments telescopically jointed, is fixed to support on the top end of the post a lamp unit. A battery set is placed inside the base to power the lamp unit with electrical wire extending through the post. A plurality of legs are provided to each extend through holes formed on the base. Each of the legs is constituted by a primary member and a secondary member pivoted together with the primary member extending out of the respective hole of the base and the secondary member movably received within the hole. The hole is provided with an inclined inside surface which define an expanded lower opening on the underside of the base so as to allow the primary member to extend from the base in an inclined, diverging manner to define an enlarged bottom area for more stably supporting the warning light. A solar panel system is disposed on the lamp unit and housed by a transparent dome to serve as a secondary power source. The lamp unit is also provided with a plurality of sideways extending lugs to engage and hold the secondary members of the legs when the post is telescoped so as to provide a compact, stowed configuration.

These and other objects and advantages of the present invention will become more apparent from a consideration of the following detailed description of a preferred embodiment, when read in conjunction with the accompanying drawings, wherein:

DETAILED DESCRIPTION OF THE PREFERRED EMBODIMENT

Figure 1:
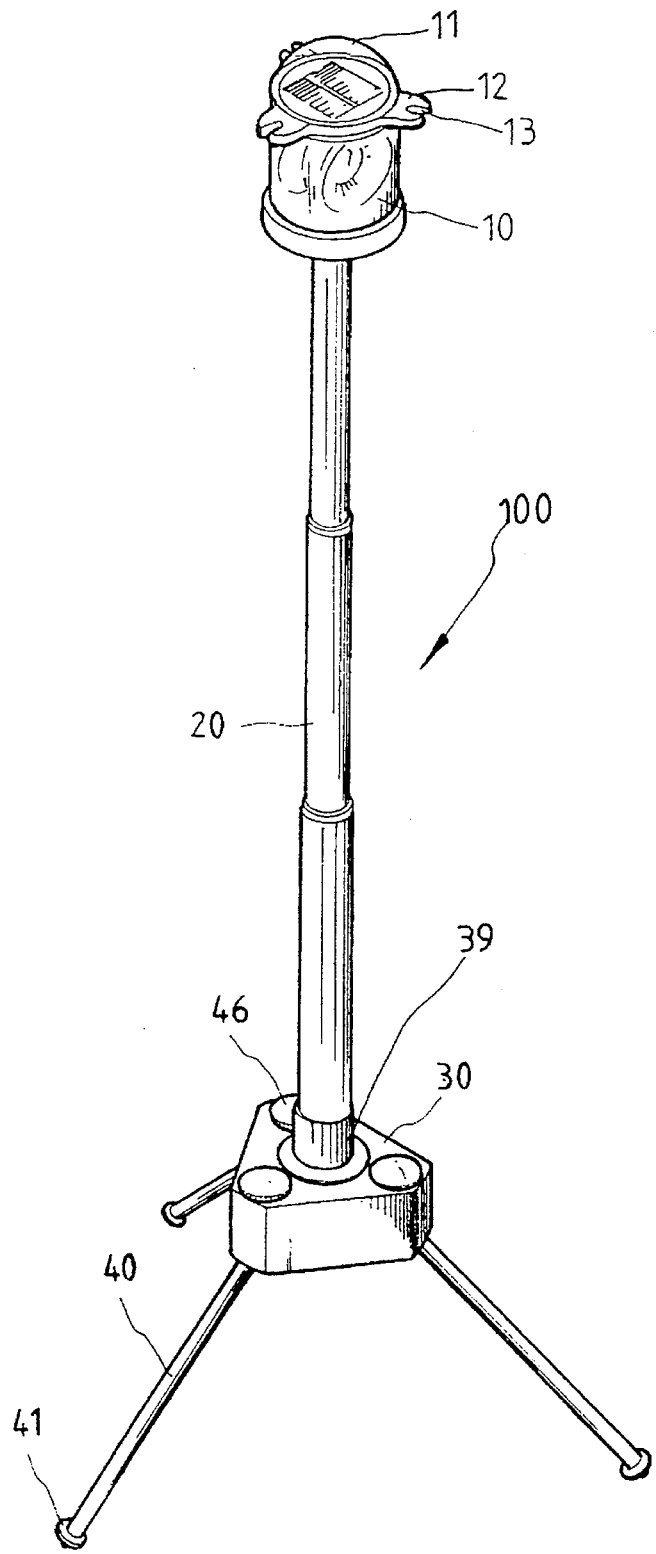
FIG. 1 is a perspective view showing a warning light constructed in accordance with the present invention.

Referring to FIG. 1, wherein a warning light constructed in accordance with the present invention, generally designated with the reference numeral 100, is shown, the warning light 100 comprises a lamp unit 10 mounted to a top end of an elongated, telescopic support post 20 which is in turn fixed, in a substantially upright manner, on a base 30 supported on ground by means of a plurality of divergingly extending legs 40.

Figure 2:
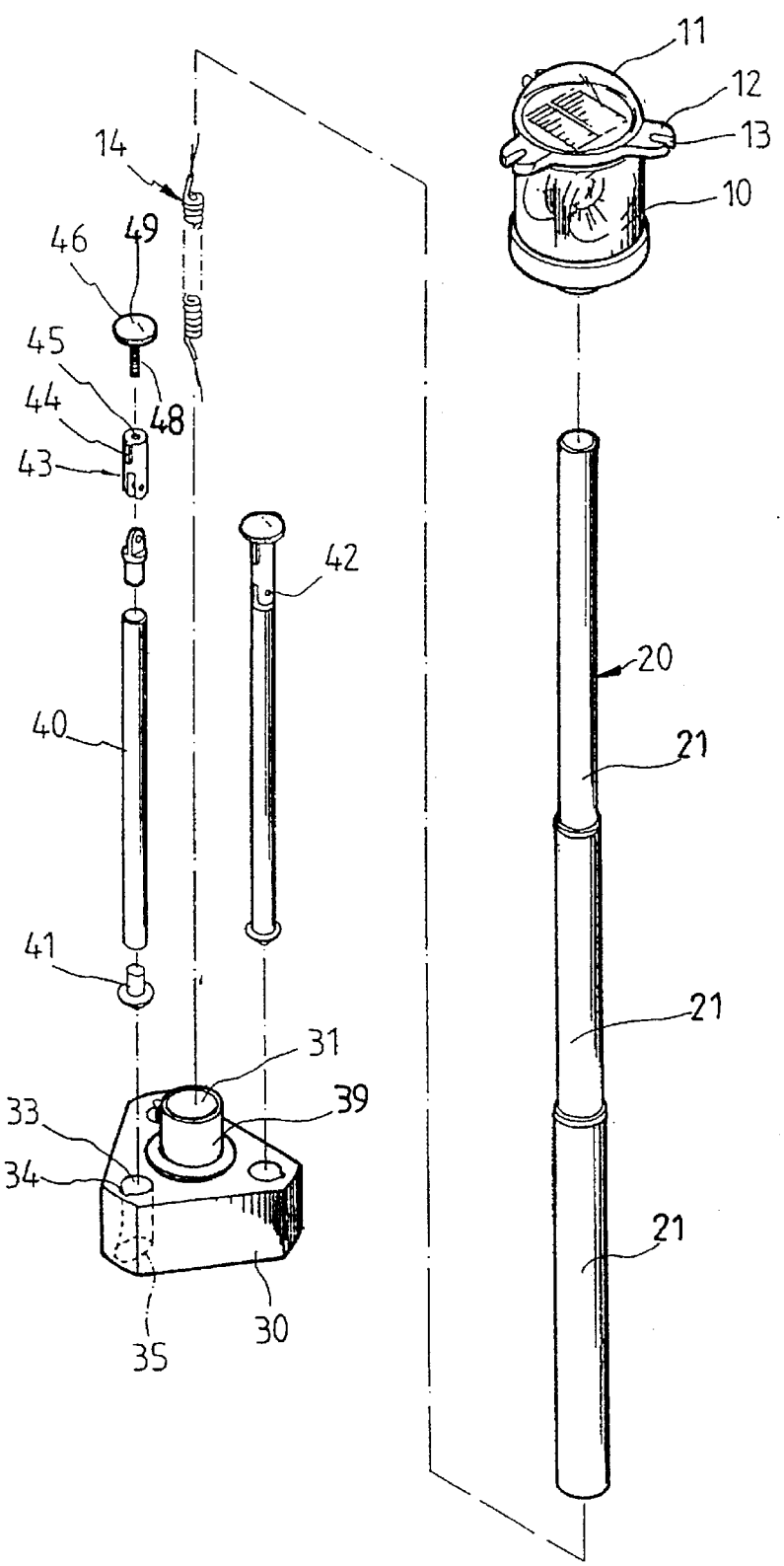
FIG. 2 is an exploded perspective view showing the warning light of the present invention.
Figure 7:
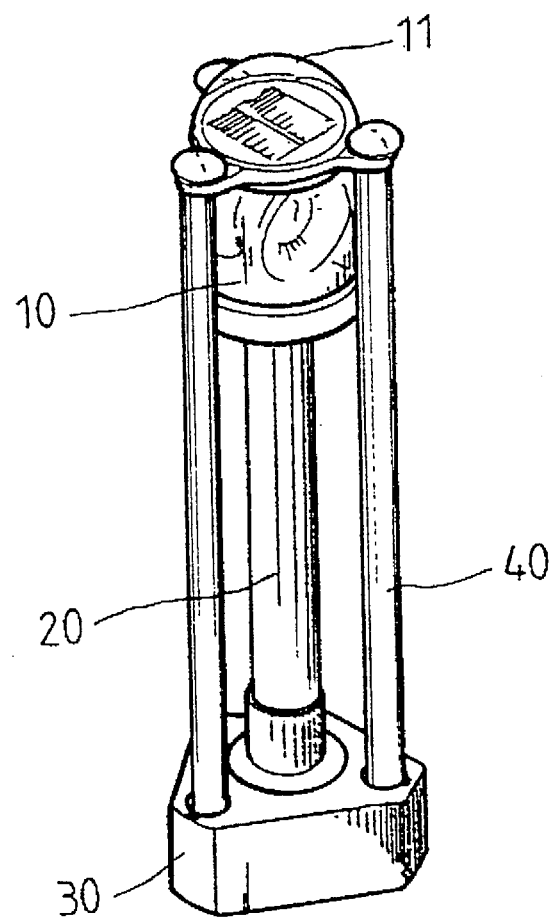
FIG. 7 is a perspective view showing the warning light in a collapsed (telescoped) condition.
Figure 8:
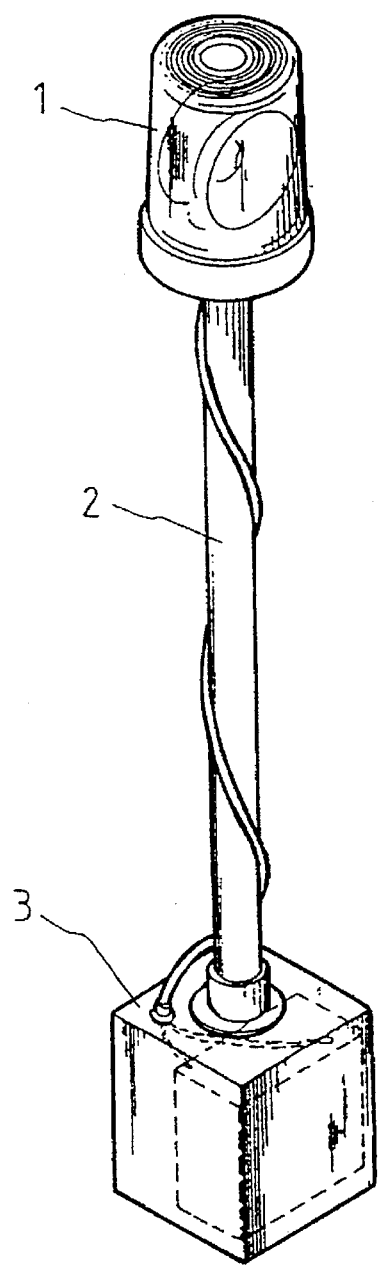
FIG. 8 is a perspective view showing a prior art warning light.

Further referring to FIG. 2, wherein an exploded perspective view of the warning light 100 is shown, the base 30 of the warning light 100 comprises a plurality of through holes 33 formed thereon preferably in an angularly equally spaced manner for receiving therein the legs 40 in such a manner to allow the legs 40 to move relative to the through holes 33 between an extended position (FIG. 1) and a stowed position (FIG. 7). Preferably, the warning light 100 comprises three legs 40 to be correspondingly received within three through holes 33 formed on the base 30.

Each of the legs 40 is provided with an anti-slippage member 41 fixed on a lower end of the leg 40 to contact ground and prevent the warning light 100 from slippage on ground when the legs 40 are in the extended position. Preferably, the anti-slippage members 41 have an expanded portion with a sectional dimension larger than the legs 40. Preferably, the legs 40 are tubular members with two opposite open ends and the anti-slippage members 41 that may be made of any suitable anti-slippage material, such as rubber, are made to have a plug portion to tightly fit into and fixed within one of the open ends of the respective leg 40 and an expanded portion that is not receivable within the through holes 33 of the base 30.

Each of the legs 40 is also provided with a knuckle joint 47 on an upper end thereof, opposite to the anti-slippage member 41. Preferably, the knuckle joint 47 is also provided with a plug portion to tightly fit into the open end of the respective leg 40 that is opposite to the anti-slippage member 41. A secondary leg member 43 is pivoted to the knuckle joint 47 by means of pivot pin 42 to be rotatable relative to the leg 40. The secondary leg member 43 is provided with an inner-threaded hole 45 to threadingly engage a threaded section 48 of an adjusting knob 46 which will be further described.

Figure 3:
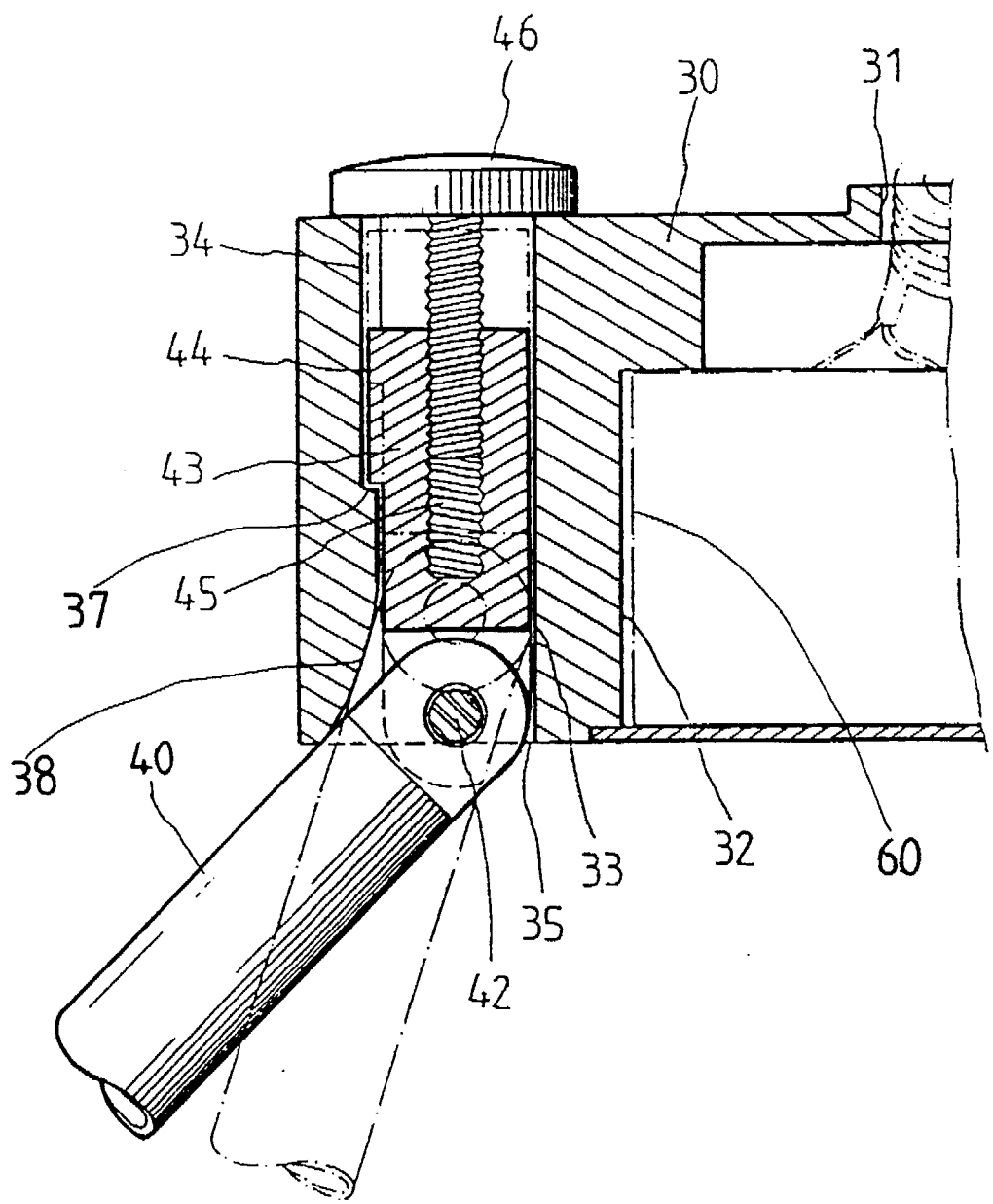
FIG. 3 is a partially cross-sectional view showing the mounting of a leg to the base of the warning light of the present invention.

Also referring to FIG. 3, each of the through holes 33 that are formed on the base 30 is dimensioned to allow the respective leg 40 to move therethrough with the secondary leg member 43 received within the through hole 33 when the leg 40 is in the extended position. The through hole 33 comprises a side slot 34 formed on an inside surface of the through hole 33 and extending along a length of the through hole 33. Correspondingly, each of the secondary leg members 43 is provided with a positioning rib 44 receivable within the side slot 34 for properly positioning the leg 40 relative to the respective through hole 33. Further, the side slot 34 is also provided with an inside stop end 37 which serves to maintain the secondary leg member 43 within the through hole 33 in the extended position.

The adjusting knob 46 comprises a threaded section 48 engageable with the inner-threaded hole 45 of the secondary leg member 43 and an expanded head 49 fixed to the threaded section 48. The expanded head 49 has an external dimension larger than the through hole 33 so that when the threaded section 48 engages the inner-threaded hole 45 of the secondary leg member 43, the expanded head 49 is in contact engagement with circumference of the through hole 33 so as to maintain the secondary leg member 43 within the through hole 33 in the extended position.

The threading engagement between the adjusting knob 46 and the secondary leg member 46 allows a user to adjust the relative position of the secondary leg member 43 with respect to the through hole 33 by turning the adjusting knob 46 relative to the secondary leg member 43.

Each of the through holes 33 is provided with a diverging, expanded lower opening 35 which is defined by an inclined inside surface 38 of the hole 33 which is formed so as to allow the leg 40 to rotate outward and away from each other along the inclined inside surface 38 of the through hole 33 when the leg 40 is moving toward the extended position and thus defining a downward-diverging, inclined configuration relative to the base 30 of the warning light 100, as shown in FIG. 1. The diverging inclination of the legs 40 relative to the base 30 provides the warning light 100 with a great bottom area which more stably supports the warning light 100.

When the adjusting knobs 46 are turned in such a direction to move the secondary leg members 43 toward the adjusting knobs 46 and thus retract the legs 40 partially into the through holes 33, the inclined inside surfaces 38 of the through holes 33 force the lower end of the legs 40 to move toward each other and reduce the bottom area provided by the legs 40. With such an arrangement, the present invention allows a user to adjust the bottom area of the warning light 100 to any desired size. The adjustment of the bottom area defined by the legs 40 accompanies a change in the vertical altitude defined by the legs 40.

The base 30 is also provided with an interior chamber 32 for receiving and holding therein a battery set 60 (shown in phantom line). A top opening 31 is formed on the base 30 and in communication with the battery chamber 32 to receive and support a lower end of the telescopic post 20. In this respect, preferably, a sheath 39 is provided around the top opening 31 for more securely supporting the telescopic post 20.

The telescopic post 20 comprises a plurality of tubular segments 21, which is the embodiment illustrated is three, telescopically moveable between an expanded position (FIG. 1) and a telescoped position (FIG. 7). Each of the segments 21 is a hollow tubular member through which electrical wire 14 preferably in a helical form for better extendibility extends from the battery set 60 to the lamp unit 10 mounted on the top end of the post 20. The length of the segments 21 is designed in accordance with the length of the legs 40 for the purpose to be further described.

Figure 6:
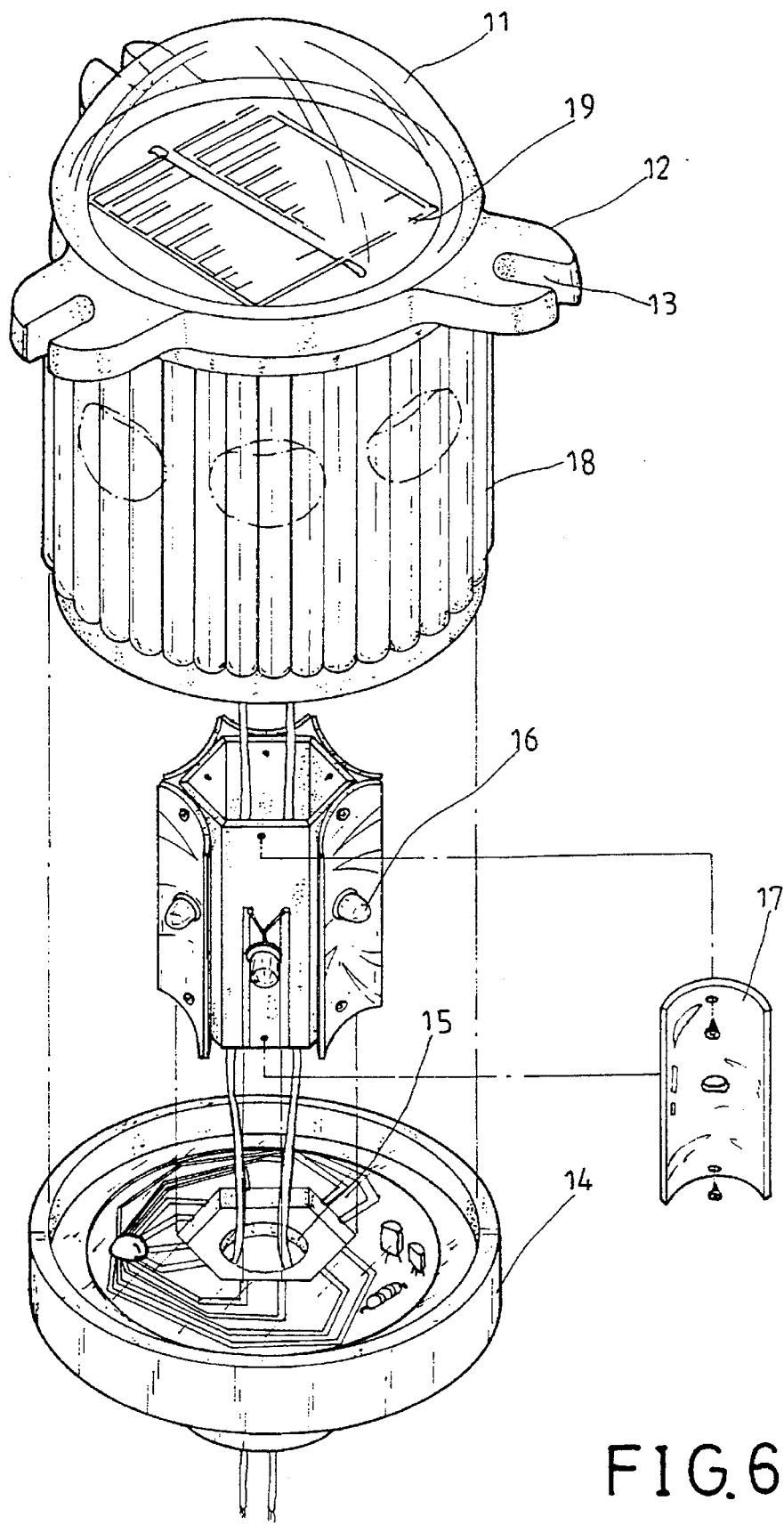
FIG. 6 is an exploded view of the lamp unit of the warning light of the present invention.

The lamp unit 10 comprises a support tray 14, see FIG. 6, having a central through hole 15 to mount to the top end of the telescopic post 20. The electrical wire 41 that extends through the telescopic post 20 runs through the hole 15 to connect to and supply power to illuminators 16 serving as light source of the lamp unit 10. Each of the illuminators 16 is fixed on a concave reflector 17 which is supported on the tray 14 and has a reflective surface to project the light generated by the illuminators 16. The illuminators 16 may be any suitable light sources, such as light emitting diodes. A housing 18 is fixed on the tray 14 and housing the illuminators 16. The housing 18 is made light transmittable at least at portions thereof to allow the light generated by the illuminators 16 and reflected by the reflectors 17 to emit outward.

On the top of the housing 18, a transparent dome member 11 is provided to enclose therein a solar panel 19 which serves as a secondary power source of the warning light 100.

Inside the housing 18, there may be suitable electronic devices, such as printed circuit board with electronic elements mounted thereon, if desired.

A plurality of side projections 12 are provided on the housing 18 to be respectively corresponding to the legs 40. Each of the side projections 12 is provided with a radial slot 13 to be further described hereinafter.

In FIG. 7, a stowed configuration of the warning light 100 is shown. In stowing the warning light 100, the legs 40 are moved through the holes 33 from the extended position to the stowed position to bring the anti-slippage members 41 into contact engagement with the lower expanded openings 35 of the respective holes 33 and the secondary leg members 43 moving out of the through holes 33 from the upper surface of the base 30 to get close to the respective lugs 12 by having the segments 21 of the post 20 telescoped. The post 20 is collapsed from the expanded position to the telescoped position to allow the threaded sections 48 of the adjusting knobs 46 to be received within respective slots 13 of the lugs 12. By tightening the adjusting knobs 46 on the lugs 12, the legs 40 are secured in an upright manner between the lugs 12 and the base 30. The expanded portions of the anti-slippage members 41 that have a sectional dimension larger than the lower openings 35 of the holes 33 serve to fix the legs 40 in position in securing the legs 40 to the lugs 12.

Figure 4:
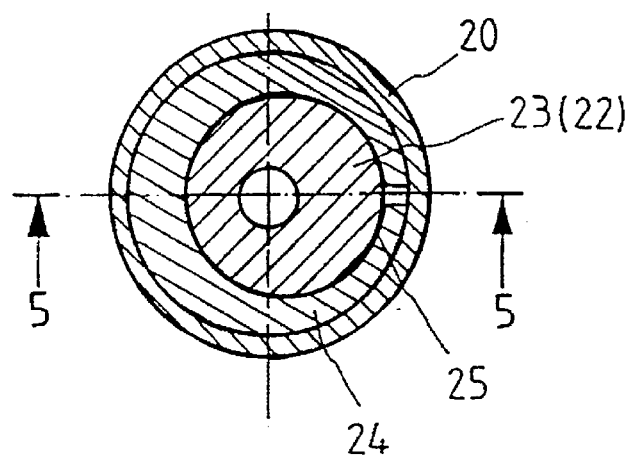
FIG. 4 is a cross-sectional view of the support post of the warning light of the present invention.
Figure 5:
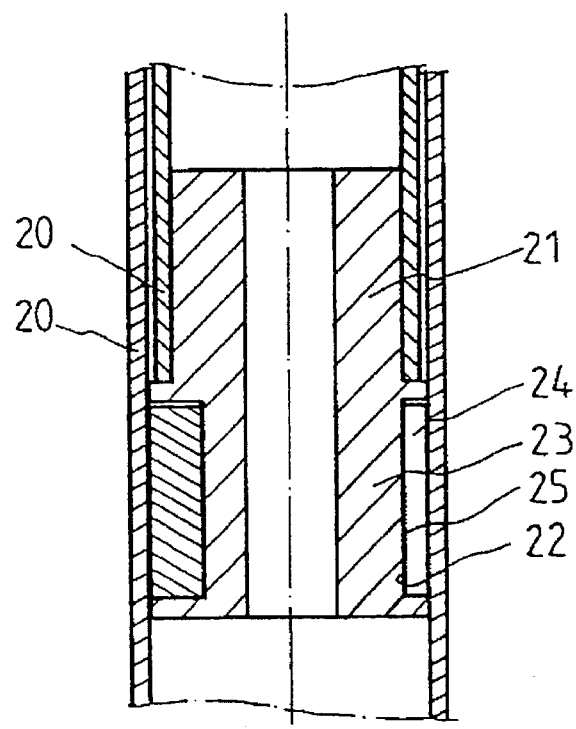
FIG. 5 is a sectional view taken along line 5—5 of FIG. 4.

In FIGS. 4 and 5, a fastening structure for fixing the telescoping segments 21 in a desired position is shown. The fastening structure comprises a plug 21 tightly fit into and fixed in one end of one of the tubular segments 21. The plug 21 is provided with an eccentric neck 23 which is offset from the axis of the plug 21, as shown in FIG. 4 so as to define a non-uniform ring-like space 22 between the neck 23 and the inside surface of a next one of the segments 21. A ring member 24 having a corresponding, non-uniform thickness is snugly fit into the space 22. Due to the non-uniform thickness of the ring member 24, by rotating the segment 21 relative to the next segment, the two segments 21 are secured and relative axial movement therebetween is prevented. Through hole may be provided on the plug 21 to allow the wire 14 to extend therethrough.

Those skilled in the art will readily recognize that various modifications of the present invention may be made. Accordingly the embodiment illustrated herein is exemplary only in nature and the scope of the instant invention should be limited only by that of the following claims.

What is claimed is:

1. A warning light comprising:

a base on which a plurality of through holes are formed to extend from an upper surface to an under surface of the base, each of the through holes having a diverging, expanded lower opening formed on the under surface which is defined by an inclined inside surface of the through hole;

an elongated post which is fixed to the base and extend therefrom, the post comprising a plurality of tubular segments telescopically jointed together so as to be movable within an expanded position and a telescoped position;

a lamp unit fixed on a top end of the post, opposite to the base;

a primary power source received and held in an interior chamber defined within the base and electrically connected to the lamp unit through electrical wire extending through the tubular segments of the post;

a plurality of legs movably received within the plurality of through holes to support the base on an external fixture by means of lower ends of the legs, each leg comprising a primary member and a secondary member pivoted to an upper end of the primary member, the legs being movable relative to the base between an extended position where the secondary members of the legs are held within the through holes and the primary members extend out of the expanded lower openings of the through holes from the under surface of the base and are allowed to rotate relative to the secondary members along the inclined inside surfaces of the through holes to define an inclined, diverging configuration of the lower ends of the legs and a stowed position where the lower ends of the legs are held within the through holes to have the secondary members extending out of the through holes from the upper surface of the base, fastening means being provided to secure the legs in the stowed position.

2. The warning light as claimed in claim 1, further comprising a secondary power source in electrical connection with the lamp unit.

3. The warning light as claimed in claim 2, wherein the secondary power source comprises a solar panel arranged on the lamp unit and housed by a transparent cover.

4. The warning light as claimed in claim 1, wherein each of primary members of the legs comprises an anti-slippage member fixed on the lower end thereof.

5. The warning light as claimed in claim 1, wherein each of primary members of the legs comprises an expanded portion formed on the lower end thereof to be in contact engagement with the lower expanded opening of the respective through hole to maintain the leg in the stowed position.

6. The warning light as claimed in claim 1, wherein the lamp unit comprises a tray fixed on the top end of the post and a plurality of illuminators associated with a reflector fixed on the tray, a housing being provided to house the illuminators and the reflector.

7. The warning light as claimed in claim 1, wherein the segments of the post and the legs are so dimensioned that when the legs are secured in the stowed position, the segments are in the telescoped position.

8. The warning light as claimed in claim 7, wherein the fastening means for securing the legs in the stowed position comprises a plurality of sideways projections formed on the lamp unit, each having a radial slot, and an threading member in threading engagement with an inner threaded hole of each of secondary members of the legs, the threading members being receivable within the radial slots to fix the secondary members of the legs to the sideways projections by tightening the threading engagement between the threading members and the secondary members of the legs.

9. The warning light as claimed in claim 1, wherein each of secondary members of the legs is provided with an inner-threaded hole to threadingly engage a threaded section of an adjusting knob, the adjusting knob having an expanded portion to be in contact engagement with circumference of the respective through hole at the upper surface of the base to adjustably hold the leg in the extended position.

10. The warning light as claimed in claim 1, wherein each of the legs comprises location adjusting means for adjusting the location of the secondary member relative to the through hole when the leg is in the extended position.

11. The warning light as claimed in claim 10, wherein the adjusting means comprises an inner-threaded hole provided on each of the secondary members threadingly engaging a threaded section of an adjusting knob, the adjusting knob having an expanded portion to be in contact engagement with circumference of the respective through hole at the upper surface of the base to adjustably hold the leg in the extended position.

12. The warning light as claimed in claim 1, wherein each of secondary members of the legs is provided with a side rib slidably receivable within a slot formed on an inside surface of the respective through hole.

13. The warning light as claimed in claim 1, wherein the illuminators comprise light emitting diodes.

14. The warning light as claimed in claim 1, wherein the telescopic post comprises location securing means to hold the lamp unit that is fixed on the top end of the telescopic post in a desired altitude relative to the base.

15. The warning light as claimed in claim 14, wherein the location securing means comprises a plug member fixed within one end of a first one of the segments, the plug member having an eccentric neck which defines a non-uniform ring space with an inside surface of a next, second one of the segments to receive therein a ring member of complemental configuration so that by rotating the first segment relative to the second segment, the engagement between the non-uniform ring member with the inside surface of the second segment serves to secure the second segment relative to the first segment.

16. The warning light as claimed in claim 1, wherein the primary power source comprises a battery set.

* * * * *